United States Patent
Dannhauer et al.

(10) Patent No.: US 8,069,729 B2
(45) Date of Patent: Dec. 6, 2011

(54) PRESSURE GAUGE

(75) Inventors: Wolfgang Dannhauer, Sandersdorf (DE); Michael Philipps, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 114 days.

(21) Appl. No.: 12/311,914

(22) PCT Filed: Oct. 9, 2007

(86) PCT No.: PCT/EP2007/060727
§ 371 (c)(1),
(2), (4) Date: Jan. 29, 2010

(87) PCT Pub. No.: WO2008/046769
PCT Pub. Date: Apr. 24, 2008

(65) Prior Publication Data
US 2010/0139407 A1    Jun. 10, 2010

(30) Foreign Application Priority Data
Oct. 20, 2006    (DE) .......................... 10 2006 050 451

(51) Int. Cl.
*G01L 19/04* (2006.01)
(52) U.S. Cl. ........................................................ 73/708
(58) Field of Classification Search .................. None
See application file for complete search history.

(56) References Cited

U.S. PATENT DOCUMENTS

| | | | |
|---|---|---|---|
| 4,563,902 A * | 1/1986 | Kohnlechner | 73/708 |
| 5,394,345 A | 2/1995 | Berard | |
| 6,681,637 B2 * | 1/2004 | Jacob et al. | 73/708 |
| 2002/0026835 A1 * | 3/2002 | Jacob et al. | 73/708 |
| 2002/0124654 A1 * | 9/2002 | Jacob et al. | 73/708 |
| 2005/0000290 A1 | 1/2005 | Petit | |
| 2007/0068264 A1 * | 3/2007 | Muth et al. | 73/715 |
| 2009/0158853 A1 * | 6/2009 | Berner et al. | 73/724 |
| 2011/0100129 A1 * | 5/2011 | Gruhler | 73/708 |
| 2011/0100130 A1 * | 5/2011 | Gruhler | 73/708 |

FOREIGN PATENT DOCUMENTS

| | | |
|---|---|---|
| DE | 3503489 | 7/1986 |
| DE | 242 274 | 1/1987 |
| DE | 4108460 | 9/1992 |
| DE | 4315336 | 11/1994 |
| DE | 10150691 | 4/2003 |
| DE | 10319417 | 11/2004 |
| WO | WO 92/16886 | 10/1992 |
| WO | WO 03/034015 | 4/2003 |

* cited by examiner

*Primary Examiner* — Andre Allen
(74) *Attorney, Agent, or Firm* — Bacon & Thomas, PLLC

(57) ABSTRACT

A pressure measuring device for measuring and/or monitoring the pressure of a measured medium. The pressure measuring device includes a sensor housing and a measurement transmitter, wherein assigned to the sensor housing is a pressure measuring cell with a pressure sensitive measuring element. Assigned to the pressure measuring cell is a temperature sensor, and assigned to the measurement transmitter is a control/evaluation unit. In order to increase the measurement accuracy of the pressure measuring device, it is provided, that the control/evaluation unit, in the case of an abrupt change of the temperature registered by the temperature sensor, ascertains, or provides, a step response, wherein the step response has a sensor-type-specific, settling time, and the control/evaluation unit, on the basis of the ascertained, or provided, step response, references the corresponding time-dependent integral temperature of the pressure measuring cell, in order to eliminate, or to compensate, the temperature influence on the pressure measurement signal provided by the measuring element.

11 Claims, 4 Drawing Sheets

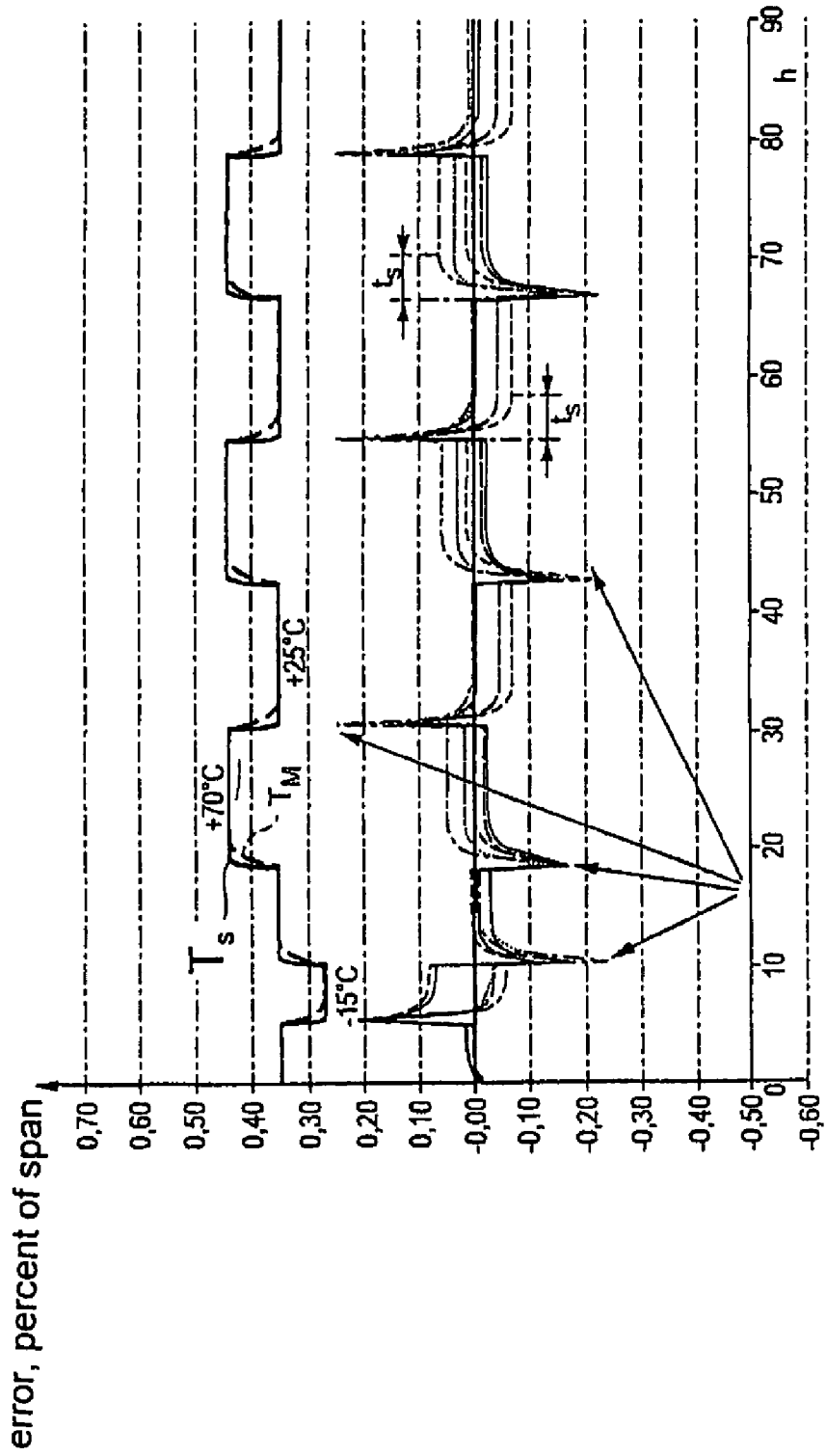

PRESSURE GAUGE

TECHNICAL FIELD

The invention relates to a pressure measuring device for measuring and/or monitoring pressure of a measured medium. The pressure measuring device includes a sensor housing and a transmitter, wherein, in the sensor housing, a pressure measuring cell with a pressure sensitive measuring element is arranged. Assigned to the pressure measuring cell is at least one temperature sensor, and assigned to the transmitter is a control/evaluation electronics.

BACKGROUND DISCUSSION

Known pressure measuring devices ascertain pressure of a measured medium in a container either by means of a capacitive or a piezoresistive pressure measuring cell with a correspondingly designed measuring bridge, or with a correspondingly designed measuring element, either of which is usually an integral part of a chip. In both embodiments, the measurement signal representing pressure is also dependent on temperature. In order to eliminate the temperature influence on the measured value and so to reach a desired high accuracy of measurement, it is necessary to compensate the disturbing variable 'temperature' in a suitable manner.

From the state of the art, known solutions propose to compensate the disturbance 'temperature' either analogy via a corresponding compensation circuit or digitally via a characteristic curve examination in the case of different selected temperature levels in the working range of the pressure measuring device. An analog compensation circuit is disclosed, for example, in German Patent DE 35 03 489 A1. The digital compensation uses an algorithm, which enables removal of a measurement error arising due to a temperature change by calculation at the pressure measuring device. A known algorithm is based, for example, on the method of least squares, or linear regression.

Applied is also the following algorithm: On the basis of comparison of measured values, provided via the measuring bridge, with corresponding reference values, via a mathematical model with an equation system of nth order, coefficients for minimizing the characteristic curve error and temperature error are ascertained. The coefficients are then stored in a sensor electronics assigned to the pressure measuring cell, or the pressure sensor. Alternatively, for this, also a grid of known points can be stored, wherein, between these known points, an interpolation is performed. The coefficients are likewise stored in a memory of sensor electronics.

The earlier described methods for compensating the temperature effect in the case of pressure measuring devices is not without problem in all applications: Thus e.g. the characteristic curve examination for ascertaining the temperature dependent correction values occurs always at a point in time, when the pressure measuring cell is 'warmed through', when, thus, all mechanical components of the pressure measuring cell, especially the housing platform, the measuring flanges and the pressure transfer medium, after an abrupt temperature change, are in an 'equilibrated' steady state and, thus, at the same constant temperature.

These methods cannot handle all measuring situations arising in practice, an example being the case of a pressure measuring device, which ascertains temperature, for example, at the measuring element, which—as already mentioned above—is, in many cases, an integral part of a chip, which is in contact with the measuring membrane. In many cases, the measuring membrane is isolated from the measured medium by at least one pressure transfer means. Known compensation models compensate the temperature influence nevertheless on the basis of the temperature registered at the measuring element. At times, this can cause a relatively large measurement error.

The problem, which can result from this situation, is made clear by the following example: If the surrounding temperature changes abruptly, then the temperature of the pressure measuring cell changes internally significantly slower than the currently measured temperature at the measuring element. This shows itself especially when the chip with the integrated temperature sensor is arranged outside the actual housing of the pressure measuring cell, or the solid platform, such as is the case for the pressure measuring cell schematically illustrated in FIG. 2.

If the surrounding temperature changes, now, for example, from 20° C. to 70° C., then the temperature sensor at the measuring element, or on the chip, displays relatively rapidly the 70° C., which reigns in the surroundings. In contrast, such temperature reaches the mechanical components of the pressure measuring cell only after a significantly longer time, namely when the pressure measuring cell has 'warmed through'. If the known compensation method is employed, then, over a period of time of approximately two hours, the temperature compensation will be performed on the basis of a temperature value, which is too high. As a result thereof, the pressure measuring device delivers during this time span a pressure measurement value burdened with a relatively large measurement error.

Other problematic cases of application occurring in practice are set forth, by way of example, as follows:

Case 1: At a relative, absolute or difference, pressure measuring device, a change, especially an abrupt change, occurs in the surrounding temperature.

In this case, primarily the temperature of the measurement transmitter, which contains the electronic components of the pressure measuring device, changes. Examples of this case are temperature changes as a result of change of solar radiation or as a result of movement of a missile. Also installation of the pressure measuring device in the vicinity of the measured medium has a large influence, moreover, when the device is temporarily exposed e.g. to the radiative heat from open, firing hatches or during metal tapping in foundries.

Case 2: At a difference pressure measuring device, the temperature, in the case of an abrupt change of temperature of the measured medium, changes in both pressure measuring chambers almost simultaneously. Examples of this case are fill-level measurements at containers with variable temperature of the measured medium, e.g. the filling of a hot liquid into a container residing earlier at room temperature. This situation can occur, in among other ways, in the context of cleaning cycles or in the case of flow measurements with orifices where the measured media have a variable temperature.

Case 3: At a relative, absolute or difference, pressure measuring device, the temperature of the measured medium changes unilaterally. An example of this is fill level measurement in a container having a unilateral flange mount—here, thus, the reference side is open. This situation can occur, for example, in the case of pressure measurement in an open container.

SUMMARY OF THE INVENTION

An object of the invention is to improve the accuracy of measurement of a pressure measuring device. Especially, accuracy of measurement should be improved at times, when the pressure measuring cell is exposed to relatively large, abrupt, temperature changes.

The object is achieved by the features that the control/evaluation unit, in the case of an abrupt change of temperature registered by the temperature sensor, ascertains, or provides, a step response, wherein the step response has a sensor-, or sensor-type-, specific, settling time, and that the control/evaluation unit, on the basis of the ascertained, or provided, step response, references a corresponding time-dependent, integral, or internal, temperature of the pressure measuring cell, in order to eliminate, or compensate, temperature influence on a pressure measurement signal provided by a measuring element.

In an advantageous embodiment, the control/evaluation unit detects an abrupt change of temperature, when the sensor-, or sensor-type-, specific, settling time of the pressure measuring cell is greater than the change with respect to time of the temperature measured by the temperature sensor.

As soon as this condition is fulfilled, the correction algorithm of the invention is started.

The correction can be performed in different ways: In a first embodiment, a memory unit is provided, in which are stored, in the form of coefficients or empirically ascertained, measurement curves, step responses to different abrupt changes of the temperature registered by the temperature sensor. Preferably, the step responses, which reflect the typical heating curves for the particular pressure measuring cells, or the particular types of pressure measuring cells, are ascertained in a temperature variation chamber. A practical procedure provides that the temperature variation chamber is heated to a predetermined maximum temperature; the pressure measuring cell is electrically connected and positioned in the chamber. On the basis of the pressure measurement signal delivered by the measuring element and the temperature registered by the temperature sensor as a function of time, thus, simply and precisely, the typical temperature behavior of the pressure measuring cell as a reaction to an abrupt change of the surrounding temperature can be ascertained, so that, in later measurement operation, a correspondingly matched compensation, or elimination, of the temperature influence can be performed sensor-, or sensor-type-, specifically. In FIG. 1, corresponding step responses are presented by way of example.

Alternatively, it is provided, that the control/evaluation unit calculates the step response, or the typical curve of the temperature of the pressure measuring cell in response to an abrupt temperature change in the surroundings of the pressure measuring cell as a function of the thermal conductivity and the heat capacity of the mechanical components of the pressure measuring cell. Especially a FEM simulation is used for this.

The pressure sensor is, for example, a pressure difference sensor with pressure transfer means, i.e. diaphragm seals with isolating diaphragms, arranged on both sides, or the pressure sensor is a relative or absolute, pressure sensor with a single pressure transfer means. Pressure transfer means are applied, in order to decouple the sensitive measuring element from the, in given circumstances, aggressive or corrosive, measured medium. Preferably, the two-side, or single, pressure transfer means are/is a hydraulic, pressure transfer means, because such provides a highly accurate transmission of the pressure of the measured medium to the measuring element. Preferably, silicone oil is used as pressure transfer medium.

If the pressure measuring device of the invention is used in cases in which the measured medium itself undergoes the abrupt temperature changes, then it has been found to be helpful to provide at least a second temperature sensor, which is so arranged and/or embodied, that it essentially provides information concerning the temperature of the measured medium. If the pressure measuring cell is a pressure difference sensor, then it is advantageous for registering the temperature of the measured medium to provide temperature sensors in the regions of the two isolating diaphragms. Alternatively, only one additional temperature sensor can also be provided, which is positioned, as much as possible, centrally in the pressure measuring cell and, thus, delivers information concerning the integral temperature of the pressure measuring cell.

In an advantageous further development of the pressure measuring device of the invention, the control/evaluation unit ascertains the step response of the pressure measuring cell to an abrupt temperature change on the basis of a model of the warming through of the pressure measuring cell as a function of the temperature of the measured medium and of the temperature reigning in the region of the pressure measuring cell. In this way, the reaction of the pressure measuring cell to any type of temperature change can be highly accurately determined, so that the pressure measuring device provides under any surrounding conditions an, in high measure, exact, pressure measurement value.

BRIEF DESCRIPTION OF THE DRAWINGS

The invention will now be explained in greater detail on the basis of the drawing, the figures of which show as follows:

FIG. 1a are graphical representations of step responses, which show the temperature curve of a pressure measuring cell in reaction to an abrupt change of the surrounding temperature of the pressure measuring cell;

FIG. 1b are representations of pressure measurement errors, which result from erroneous temperature values of the pressure measuring cell after an abrupt change of surrounding temperature;

DETAILED DISCUSSION IN CONJUNCTION WITH THE DRAWINGS

Figure 1C:
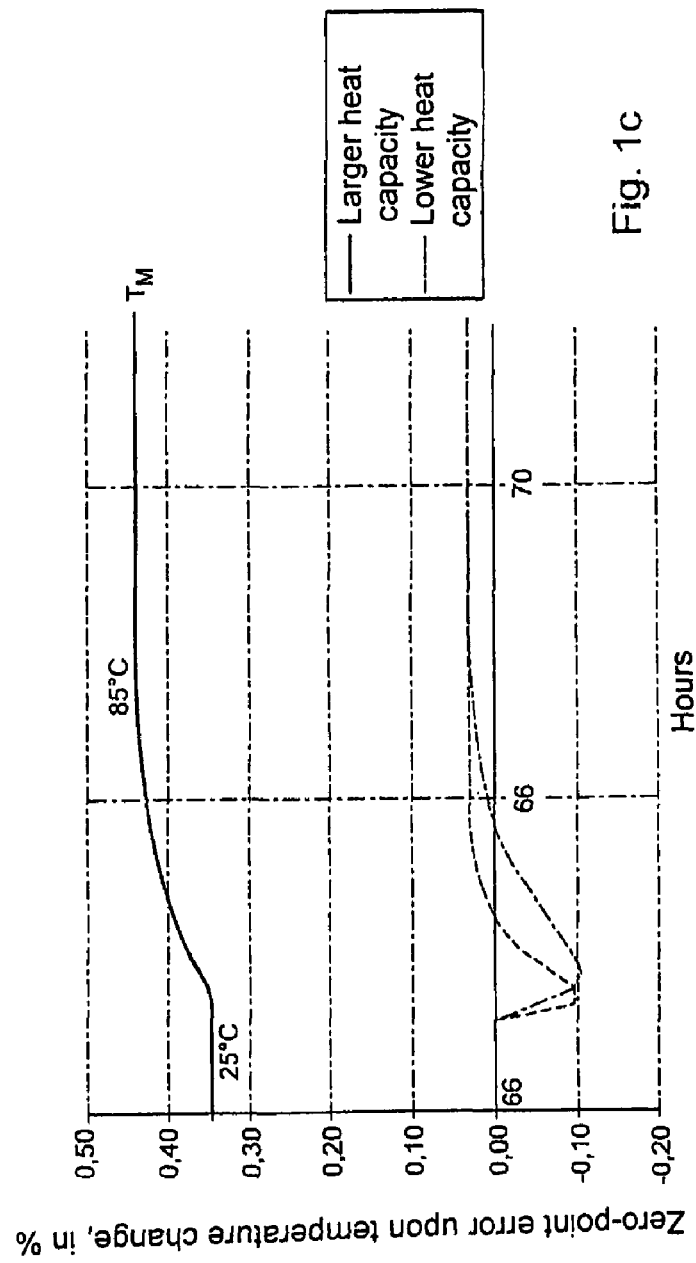
FIG. 1c is a graphical presentation for illustrating the temperature compensation of the invention for two different pressure measurement cells in the case of external temperature measurement.

The upper region of FIG. 1—i.e. FIG. 1a—provides a graphical presentation of the surrounding temperature $T_S$ and the resulting temperature measured in the region of the measuring element 5 in different pressure measurement cells 4. The temperature $T_M$ measured at the measuring element 5 follows, near in time, the change of the surrounding temperature $T_S$. While the surrounding temperature $T_S$, or the temperature $T_M$ measured at the measuring element 5, has an almost rectangular curve, the temperature $T_C$ of the pressure measuring cell 4 follows the abrupt changes of the surrounding temperature $T_S$ with delay; the equilibrium temperature $T_C$ of the pressure measuring cell 4 'limps', in time, behind the surrounding temperature $T_S$.

In the lower region of FIG. 1—i.e. in FIG. 1b—a number of different sensor-type-specific curves are presented, which illustrate the incorrect compensations, which occur, when the pressure measurement values of a pressure sensor 2 are corrected on the basis of the temperature reigning in the surroundings of the pressure measuring cell 4, or the pressure sensor 2. Shown, in each case, is the so-called zero-point error in percent. If the correction occurs under the assumption, that the temperature change of the pressure measuring cell 4 and the corresponding change of temperature of the measured medium 14, or the surroundings, are temporally parallel relative to one another, then there arises, following a temperature jump, a large deviation and, therewith, a large measurement error in the pressure measurement. The arising maximal incorrect compensations are marked with arrows in FIG. 1b. Only after passage of the sensor-, or sensor-type-, specific, settling time $t_s$ is a state reached, in which the integral temperature of the pressure measuring cell 4 and the temperature of the surroundings and/or temperature of the medium are in equilibrium.

According to the invention, this incorrect compensation is prevented. In the case of an abrupt change of the temperature registered by the temperature sensor 10; 11; 12; 13, the control/evaluation unit 16 ascertains a corresponding step response of the pressure measuring cell 4, or it provides the step response via a simulation model. The settling time $t_s$ is a specific characteristic of the sensor, or sensor-type. On the basis of the experimentally, or via simulation model, ascertained step response of the pressure sensor 2, or of the pressure measuring cell 4, to temperature jumps in the surroundings of the pressure sensor 2, or the pressure measuring cell 4, the control/evaluation unit 16 provides at all times the actual, integral temperature of the pressure measuring cell 4 for the temperature compensation. In this way, the temperature influence on the pressure measurement signal provided by the measuring element 5 can be highly accurately compensated, or, to a good approximation, eliminated.

FIG. 1c shows a graphical presentation depicting the temperature compensation of the invention in the case of two different pressure measurement cells 4 in the case of external temperature measurement. The temperature $T_M$ measured at the measuring element 5 changes in reaction to an abrupt change in the surrounding temperature relatively rapidly from 25° C. to 85° C. The corresponding curve is shown in the upper region of FIG. 1c.

The solid line in the lower region of FIG. 1c shows the zero-point error, which occurs in the case of a pressure measuring cell 4, which has a relatively large heat capacity and a relatively low thermal conductivity; the dashed line, likewise in the lower region, shows the zero-point error, which occurs in the case of a pressure measuring cell 4, or a type of pressure measuring cell 4, which has a relatively low heat capacity and a relatively large thermal conductivity. These sensor-, or sensor-type-, specific, incorrect compensations of the state of the art are eliminated by means of the invention, so that also in the transitional, or transient, region, temperature compensation occurs on the basis of the actual temperature of the pressure measuring cell.

Figure 2:
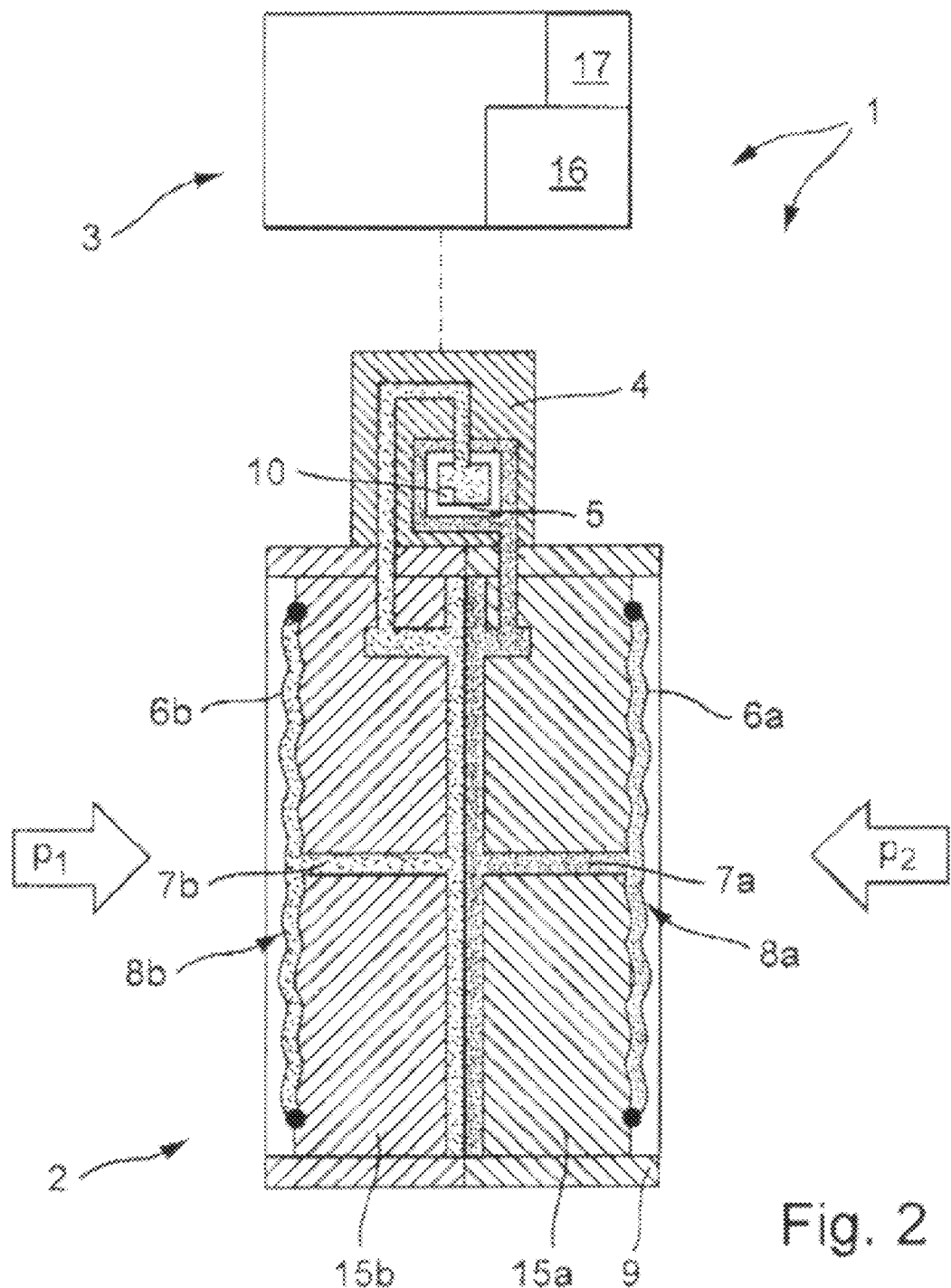
FIG. 2 is a first embodiment of a pressure measuring device of the invention, wherein the temperature sensor is assigned to the pressure measuring cell.

FIG. 2 shows a first form of embodiment of the pressure measuring device 1 of the invention, wherein the temperature sensor 10 is assigned to the pressure measuring cell 4. Especially, here, the measuring element 5 is arranged away from the measuring flanges 15a, 15b and the pressure transfer means 6a, 7a, 8a, 6b, 7b, 8b. If an abrupt warming or cooling occurs in the surroundings of the pressure measuring cell 4, then the temperature sensor 10 relatively rapidly (see FIG. 1a) detects this temperature change. Due to the 'inertia' of the mechanical and hydraulic components, the pressure sensor 2 reaches the surrounding temperature provided by the temperature sensor 10 with time delay, after passage of the settling time $t_s$.

Figure 3:
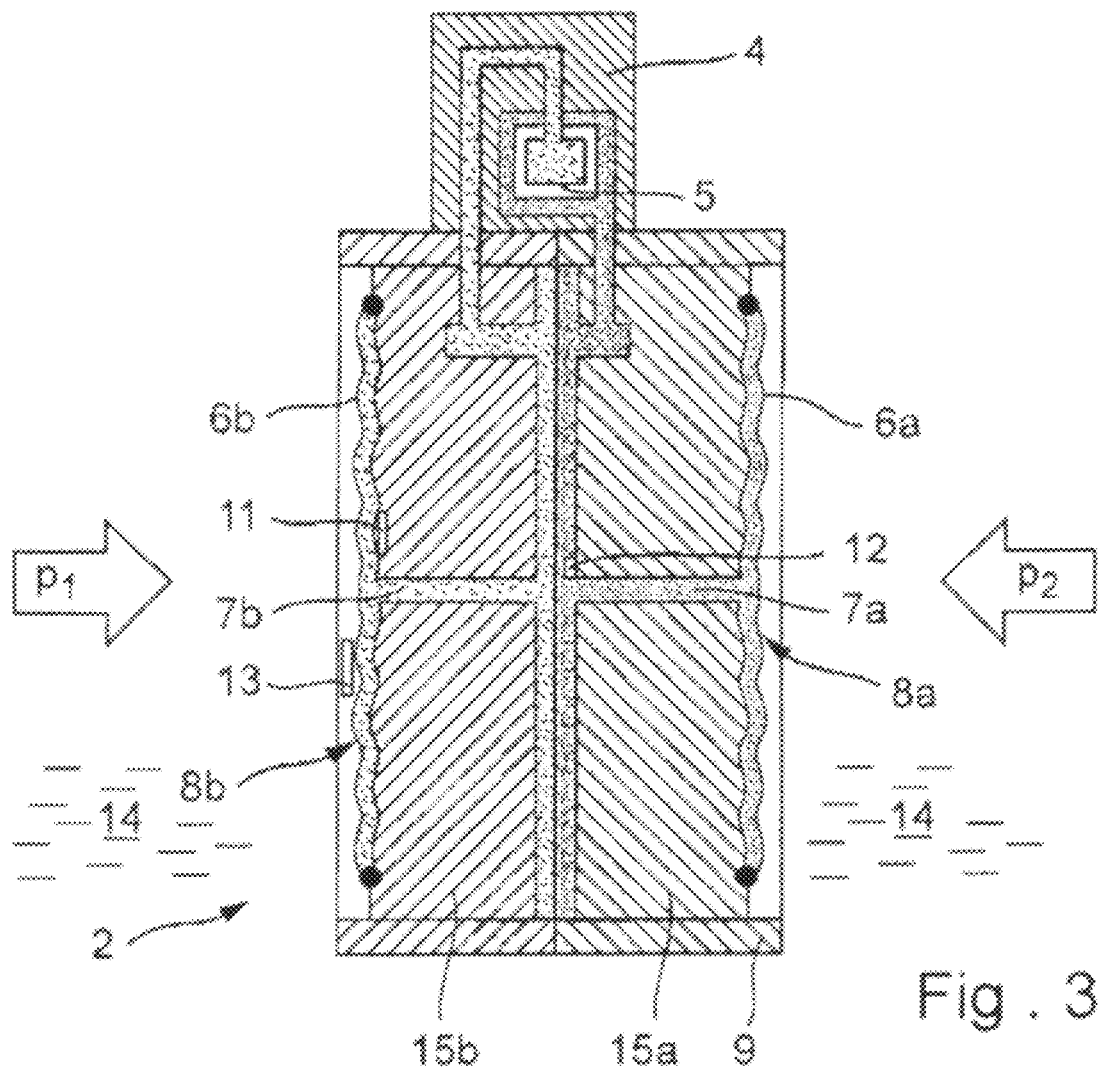
FIG. 3 is a second embodiment of a pressure measuring device of the invention, wherein different positioning options of temperature sensors for ascertaining the temperature of the pressure measuring cell are presented schematically.

In FIG. 3, other forms of embodiment of the pressure measuring device 1 of the invention are presented. These forms of embodiment differ in the arrangement of the temperature sensor 11; 12; 13. Fundamentally, it can be stated, that the positioning as well as the number of the installed temperature sensors 10; 11; 12; 13 depends on sensor type and the location of installation as well as the manner of installation in the pressure measuring device 1. For example, the temperature sensor 11 is arranged beneath the isolating diaphragm 6b and registers very rapidly a change of temperature of the measured medium 14. It is especially favorable, in this connection, that the isolating diaphragm 6b be embodied as a ring membrane, or diaphragm. A corresponding ring membrane, or diaphragm, is described in the not pre-published DE 10 2005 035 931.0 of the assignee. This ring membrane, or diaphragm, is part of the disclosure of the present application.

In contrast, temperature sensor 12 is arranged approximately in the center of the pressure sensor 2. By this arrangement, the integral temperature of the pressure sensor 2 can be registered, at least approximately. Moreover, the temperature sensor 13 is arranged in the measuring flange 15b.

For highly accurate measurements, it can be helpful, for example, to use two temperature sensors 10, 11; 10, 12; 10, 13 and to determine the current integral temperature of the pressure sensor 2 via a simulation model highly accurately.

The invention claimed is:

1. A pressure measuring device for measuring and/or monitoring the pressure of a measured medium, comprising:
    a sensor housing;
    a measurement transmitter;
    a pressure measuring cell assigned to said sensor housing, said pressure measuring cell having a pressure sensitive measuring element;
    a temperature sensor assigned to said pressure measuring cell; and
    a control/evaluation unit assigned to said measurement transmitter, said control/evaluation unit, in the case of an abrupt change of temperature registered by said temperature sensor, ascertains, or provides, a step response, wherein the step response has a sensor-, or sensor-type-, specific, settling time, wherein
    said control/evaluation unit, on the basis of the ascertained, or provided, step response, references a corresponding time-dependent integral temperature of said pressure measuring cell, in order to eliminate, or to compensate, temperature influence on a pressure measurement signal provided by said measuring element.

2. The pressure measuring device as claimed in claim 1, wherein:
    said control/evaluation unit detects an abrupt change of temperature, when the sensor-, or sensor-type-, specific, settling time of said pressure measuring cell is greater than the change with respect to time of the temperature measured by said temperature sensor.

3. The pressure measuring device as claimed in claim 1, further comprising:
    a memory unit, in which are stored, in the form of coefficients or empirically ascertained measurement curves, step responses to different abrupt changes of the temperature registered by said temperature sensor.

4. The pressure measuring device as claimed in claim 1, wherein:
said control/evaluation unit calculates the step response as a function of thermal conductivity and heat capacity of mechanical components of said pressure measuring cell.

5. The pressure measuring device as claimed in claim 4, wherein:
said control/evaluation unit applies an FEM simulation for determining the step response.

6. The pressure measuring device as claimed in claim 1, wherein:
said pressure sensor is a pressure difference sensor with pressure transfer means including isolating diaphragms on two sides.

7. The apparatus as claimed in claim 1, wherein:
said pressure sensor is a relative or absolute, pressure sensor having a single pressure transfer means, including an isolating diaphragm.

8. The apparatus as claimed in claim 6, wherein:
said pressure transfer means is a hydraulic pressure transfer means.

9. The pressure measuring device as claimed in claim 1, wherein:
said temperature sensor is arranged at said measuring element.

10. The pressure measuring device as claimed in claim 6, further comprising:
at least a second temperature sensor, which is so arranged and/or embodied, that it ascertains essentially temperature of the measured medium.

11. The pressure measuring device as claimed in claim 10, said control/evaluation unit ascertains the step response of said pressure measuring cell to an abrupt temperature change on the basis of a model of the warming through of said pressure measuring cell as a function of the temperature of the measured medium and the temperature reigning in the region of said pressure measuring cell.

* * * * *